United States Patent

Mori et al.

[11] Patent Number: 5,818,846
[45] Date of Patent: Oct. 6, 1998

[54] DIGITAL SIGNAL TRANSMISSION SYSTEM

[75] Inventors: Yasushi Mori, Higashiyamato; Naoki Ozawa, Akishima, both of Japan

[73] Assignee: Hitachi Denshi Kabushiki Kaisha, Tokyo, Japan

[21] Appl. No.: 588,703

[22] Filed: Jan. 19, 1996

[30] Foreign Application Priority Data

Jan. 26, 1995  [JP]  Japan ................................. 7-010267

[51] Int. Cl.$^6$ ............................................. H04J 3/00
[52] U.S. Cl. ......................... 370/532; 370/536; 370/537
[58] Field of Search ................................. 370/498, 532, 370/533, 535, 536, 537, 540, 542, 543, 544, 212, 213

[56] References Cited

U.S. PATENT DOCUMENTS

| | | | |
|---|---|---|---|
| 5,136,587 | 8/1992 | Obana et al. | 370/535 |
| 5,426,644 | 6/1995 | Fujimoto | 370/535 |
| 5,428,664 | 6/1995 | Kobayashi | 379/58 |
| 5,557,636 | 9/1996 | Sato | 375/260 |
| 5,559,838 | 9/1996 | Nakagoshi | 375/347 |

FOREIGN PATENT DOCUMENTS

| | | |
|---|---|---|
| 0053239 | 6/1982 | European Pat. Off. . |
| 0394490 | 10/1990 | European Pat. Off. . |
| 0483458 A2 | 5/1992 | European Pat. Off. . |
| 0483458 A3 | 5/1992 | European Pat. Off. . |

*Primary Examiner*—Alpus H. Hsu
*Assistant Examiner*—Kwang Bin Yao
*Attorney, Agent, or Firm*—Antonelli, Terry, Stout, & Kraus, LLP

[57] ABSTRACT

A digital signal transmission system operates in a mode for transmitting multiplexed signals as a serial digital signal and in a mode for transmitting only a predetermined signal. A transmitter of the system includes a first control circuit which, in a particular signal transmission mode, places only a particular signal processing circuit block for transmitting a particular signal in an operative state and places in an inoperative state a multiplexer circuit block for multiplexing the predetermined signal with at least one other signal. In a multiplexed transmission mode, the first control circuit places in an operative state only the multiplexer circuit block and places in an inoperative state the particular signal processing circuit block. A receiver of the system includes a second control circuit which, in a particular signal transmission mode, places a particular signal restoring circuit block for restoring the transmission signal received through the transmission path to an operative state and places in an inoperative state a demultiplexer circuit block. In an multiplexed transmission mode, the second control circuit places in an operative state only the demultiplexer circuit block, which demultiplexes a multiplex signal received through the transmission path into a plurality of digital signals, and places into an inoperative state a particular digital signal restoring circuit block.

22 Claims, 4 Drawing Sheets

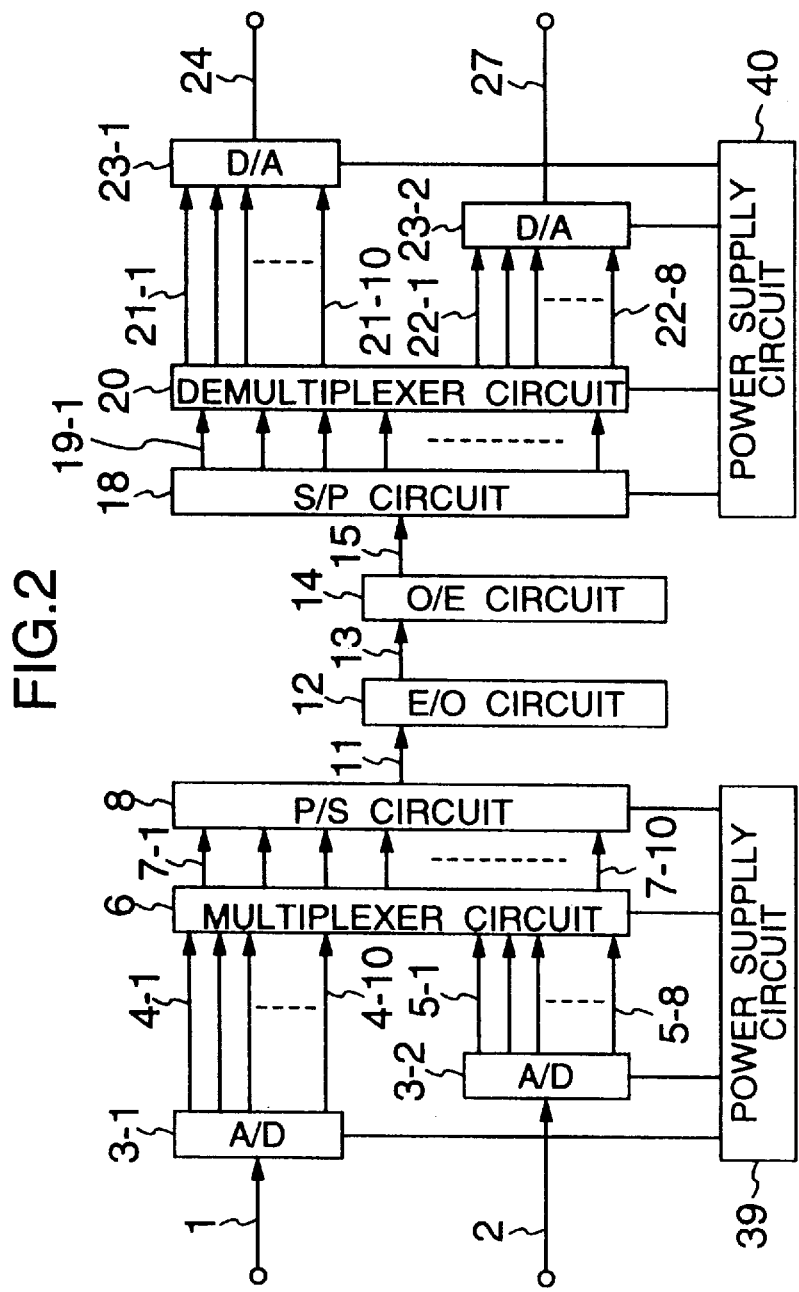

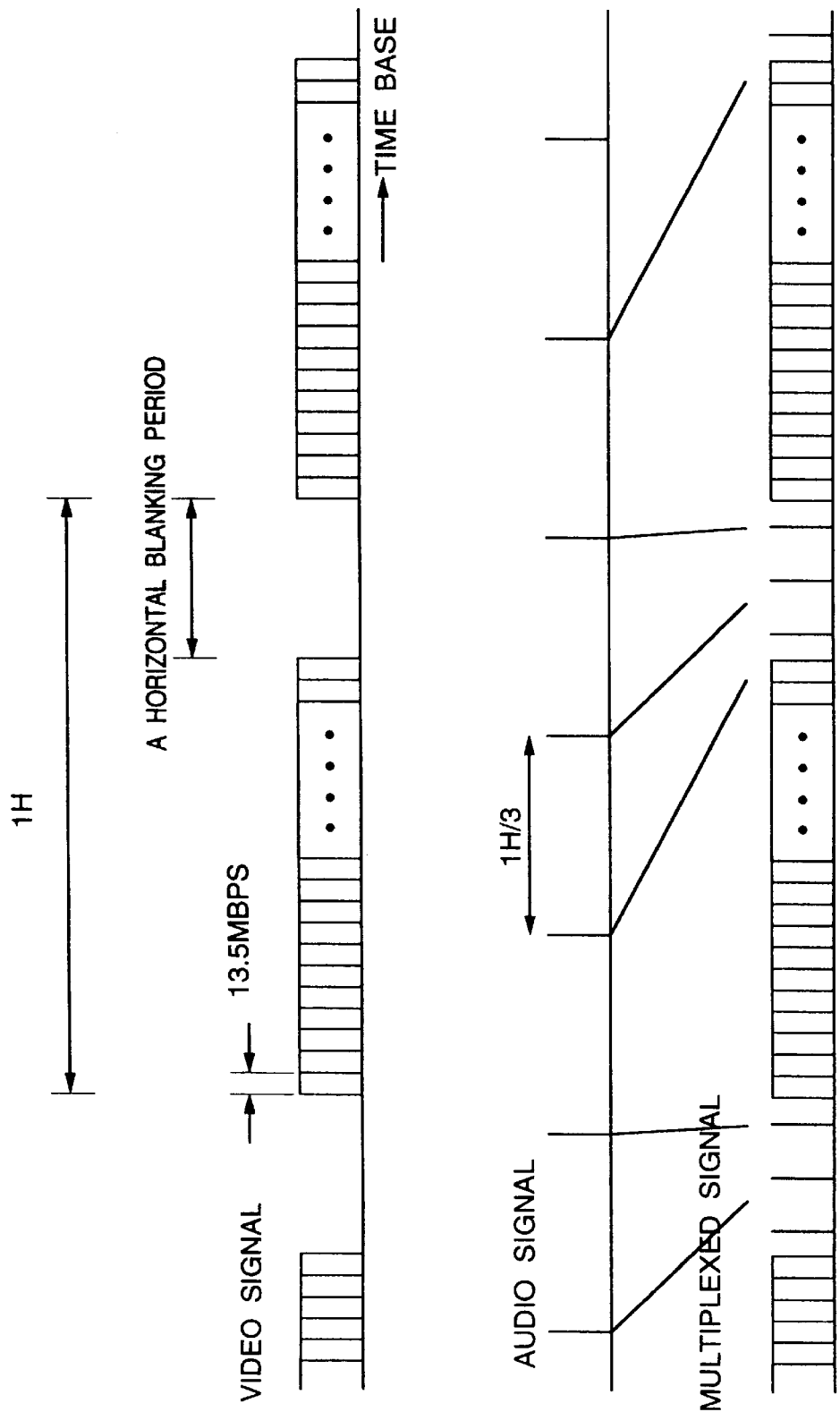

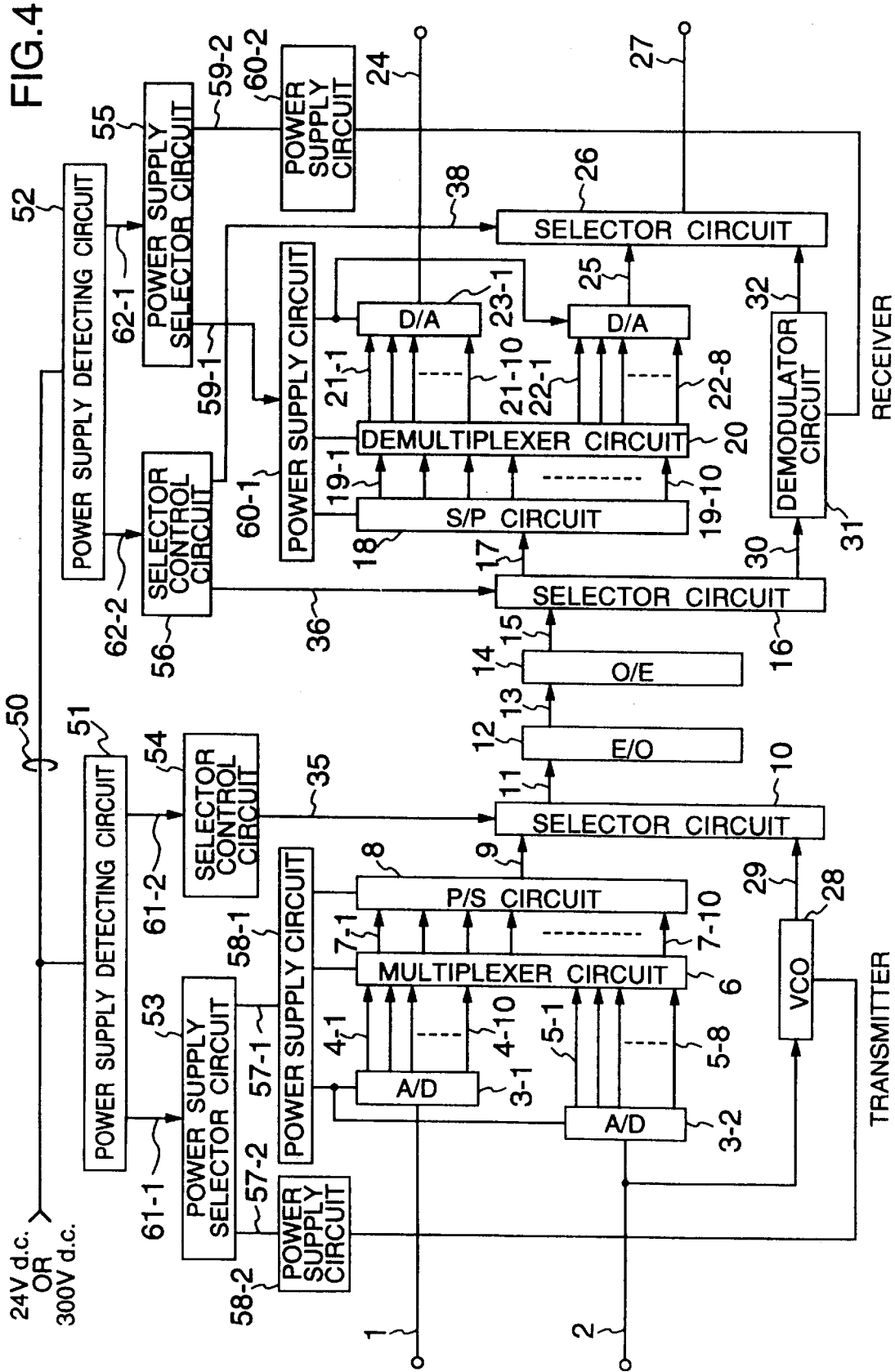

DIGITAL SIGNAL TRANSMISSION SYSTEM

BACKGROUND OF THE INVENTION

The present invention relates to a digital signal transmission system for transmitting a plurality of signals through a predetermined transmission path, and more particularly, to a digital signal transmission system which is capable of selecting an operation mode for reducing power consumption when only a part of signals is transmitted.

Generally, when a plurality of digital signals are transmitted through a single transmission path in an optical transmission apparatus using an optical fiber cable or the like, digital data quantized in 8–10 bits are multiplexed, the multiplexed parallel digital signal is converted to a serial signal for transmission, and the original parallel signal is restored on a receiver side.

For example, in a television program production studio, a plurality of video signals, audio signals and the other signals are communicated between a television camera and a camera control unit for controlling the television camera. From the television camera to the camera control units, video signals imaged by the camera and audio signals are transmitted through a transmission cable. Conversely, from the camera control units to the television camera, monitoring video signals and audio signals including instructions to a camera man are transmitted through the transmission cable.

When a plurality of such signals are transmitted in a digital form, signal multiplexing may be utilized to send the digital signals through a single transmission path.

However, the television camera and the camera control units do not always communicate all the plural signals. Actually, in many cases, audio signals only are transmitted without accompanying video signals in such as a standby mode. Generally, since analog-to-digital (A/D) convertor circuits and multiplexer circuits consume large electrical power, a digital signal transmission system capable of multiplexed transmission presents an inferior power efficiency when transmitting only audio signals.

SUMMARY OF THE INVENTION

It is an object of the present invention to provide a digital signal transmission system for transmitting a plurality of signals in a digital form which is capable of minimizing electrical power consumed by the system to achieve an efficient transmission when a particular signal only is transmitted. Signals which can be transmitted by the system according to the present invention are not limited to video signals and audio signals, but may also include data signals. Also, the particular signals are not limited to audio signals, but may also include video signals and data signals.

Prior to explaining embodiments of the present invention, an example of a digital signal transmission system for multiplexing video signals and audio signals and problems associated therewith will be considered with reference to FIG. 2.

FIG. 2 shows a system which multiplexes a digital video signal quantized in 10 bits and a digital audio signal quantized in 8 bits and transmits a multiplexed digital signal.

Referring specifically to FIG. 2, an analog video signal 1 on a transmitter side is applied to an A/D convertor circuit 3-1 to be converted to a 10-bit parallel digital video signal including bits 4-1 to 4-10. Also, an analog audio signal 2 is applied to an A/D convertor circuit 3-2 to be converted to an 8-bit digital audio signal including bits 5-1 to 5-8. The digital video signal bits 4-1 to 4-10 and the digital audio signal bits 5-1 to 5-8 are both applied to a multiplexer circuit 6.

The operation of the multiplexer circuit 6 will be next explained with reference to FIG. 3 showing a model of a multiplexing method. FIG. 3 shows, by way of example, simplified structures of a video signal which has a horizontal blanking period in every one-horizontal scanning period (1H) and is sampled at a sampling rate of 13.5 megabit sample/second (MBPS) and an audio signal which is sampled at a sampling rate of 1H/3.

For multiplexing the video signal and the audio signal as mentioned above, the time base is shifted such that a 1H portion of the audio signal is included in a 1H blanking period of the video signal, and inserted into, for example, upper 8 bits within 10 bits of the video signal.

In this way, the 10-bit digital video signal bits 4-1 to 4-10 and the 8-bit digital audio signal bits 5-1 to 5-8 are multiplexed to synthesize a 10-bit digital multiplexed signal including bits 7-1 to 7-10.

The 10-bit digital multiplexed signal bits 7-1 to 7-10 multiplexed by the above method are applied to a parallel-to-serial convertor circuit (P/S circuit) 8. The P/S circuit 8 converts the 10-bit digital multiplexed signal bits 7-1 to 7-10 to a 1-bit serial signal 11 having a frequency 10 times higher. The serial signal 11 is transduced into an optical signal 13 by an electro-optical transducer circuit (E/O circuit) 12 and transmitted to a receiver side through a transmission path.

On the receiver side, the transmitted optical signal 13 is transduced into a serial electrical signal 15 by an opto-electrical transducer circuit (O/E) 14, and applied to a serial-to-parallel convertor circuit (S/P circuit) 18. The S/P circuit 18 converts the serial signal 15 to the original 10-bit digital signal bits 19-1 to 19-10. Then, the digital signal bits 19-1 to 19-10 are demultiplexed into 10-bit digital video signal bits 21-1 to 21-10 and 8-bit digital audio signal bits 22-1 to 22-8, added in the blanking period of the video signal, by a demultiplexer circuit 20 in a manner reverse to the multiplexer circuit 6. The shifted sampling interval on the time base of the digital audio signal is returned to the original interval. Subsequently, the demultiplexed digital video and audio signals are outputted from the demultiplexer circuit 20.

The digital video signal bits 21-1 to 21-10 and the digital audio signal bits 22-1 to 22-8 are converted to an analog video signal 24 and an analog audio signal 27 by a D/A convertor circuit 23-1 and a D/A convertor circuit 23-2, respectively.

The system shown in FIG. 2 also includes power supply circuits 39, 40 for supplying electrical power to respective circuits associated therewith.

As is understood from the above description about the operation of the exemplary system, a digital signal transmission system for multiplexing a plurality of signals for transmission must operate many digital processing circuits even when transmitting only a single signal, as if the system were transmitting a plurality of signals.

Generally, since the digital processing circuit operate in high speed larger electrical power is consumed in a complicated digital processing circuit. As a result, even in a standby mode in which an audio signal only is transmitted, the video/audio multiplexing and transmission system as described above requires large power consumption.

It is therefore an object of the present invention to reduce power consumption in a digital signal transmission system which multiplexes a plurality of signals and transmits a multiplexed signal.

The present invention provides a digital signal transmission system wherein a plurality of signals are converted to plurality of digital signals, the plurality of digital signals are multiplexed, and the multiplexed parallel digital signal is converted to a serial digital signal, and the serial digital signal is sent to a predetermined transmission path on a transmitter side, while the received serial digital signal is converted to the original multiplexed parallel digital signal, and the plurality of original digital signals are demultiplexed from the parallel digital signal on a receiver side, wherein in a mode for transmitting only a predetermined signal within the plurality of analog signals, the digital signal transmission system controls to set into an inoperative state, at least units for performing the multiplexing of a plurality of digital signals and parallel-to-serial conversion on the transmitter side and units for performing serial-to-parallel conversion of a multiplexed digital signal and demultiplexing into a plurality of digital signals on the receiver side, such that the predetermined signal only is separately sent onto the transmission path through a unit for converting the predetermined signal to a transmission signal on the transmitter side, and the received transmission signal is converted to the original signal by a convertor unit on the receiver unit.

A transmitter of the digital signal transmission system according to the present invention has a multiplexer circuit block for converting a plurality of analog signals to a plurality of digital signals, multiplexing the plurality of digital signals, and sending the multiplexed signal onto a single signal transmission path, a particular signal processing circuit block for converting a particular signal within the plurality of analog signals to a transmission signal and sending the transmission signal onto the signal transmission path, and a first control circuit.

When the transmitter transmits the particular signal within the plurality of analog signals, the first control circuit controls to operate only the particular signal processing circuit block and set the multiplexer circuit block into an inoperative state. A receiver of the system has a demultiplexer circuit block for demultiplexing the multiplexed signal received through the signal transmission path into the plurality of digital signals and restoring the plurality of original analog signals, a particular signal restoring circuit block for restoring the original particular signal from the transmission signal converted from the particular signal received through the signal transmission path, and a second control circuit. When the receiver receives the particular signal within the plurality of analog signals, the second control circuit controls to operate only the particular signal restore signal block and set the demultiplexer circuit block into an inoperative state.

As a result, in the mode for transmitting a predetermined signal, set into an operative state are only the processing circuit block for converting the particular signal to a transmission signal and sending the transmission signal onto the transmission path on the transmitter side, and the processing circuit block for converting the received transmission signal to the original signal on the receiver side, while electrical power is not supplied to the digital signal multiplexer/demultiplexer circuit blocks other than the above blocks, thus providing a digital signal transmission system which can largely reduce power consumption while transmitting a part of signals.

BRIEF DESCRIPTION OF THE DRAWINGS

FIG. 2 shows an exemplary digital signal transmission system considered by the present inventor;

FIG. 3 is a diagram for explaining multiplexing of a video signal and an audio signal; and FIG. 4 is a block diagram showing another embodiment of a digital signal transmission system according to the present invention.

DESCRIPTION OF THE PREFERRED EMBODIMENTS

Figure 1:
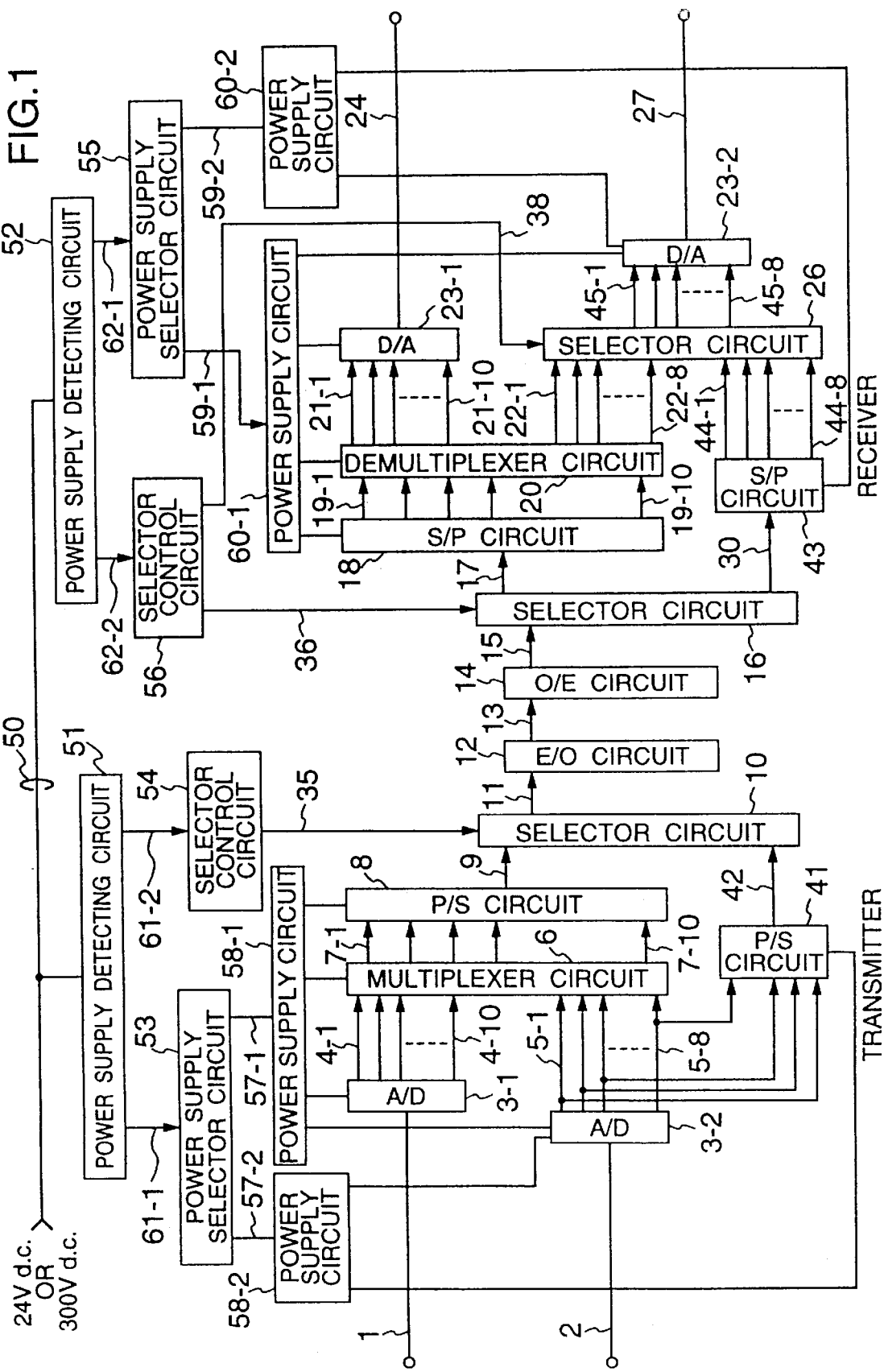
FIG. 1 is a block diagram showing an embodiment of a digital signal transmission system according to the present invention.

FIG. 1 shows a first embodiment of the present invention, and the operation of the present invention will hereinafter be described in detail. It should be first noted that the following description is made, by way of example, on a case where an analog video signal and an analog audio signal are converted to a 10-bit quantized digital video signal and an 8-bit quantized digital audio signal, respectively, and the digital video and audio signals are transmitted.

In the configuration of the embodiment shown in FIG. 1, on a transmitter side, an analog video signal 1 is applied to an A/D convertor circuit 3-1 to be converted to a 10-bit digital video signal including bits 4-1 to 4-10. Simultaneously, an analog audio signal 2 is also applied to an A/D convertor circuit 3-2 to be converted to an 8-bit digital audio signal including bits 5-1 to 5-8.

These digital video signal bits 4-1 to 4-10 and digital audio signal bits 5-1 to 5-8 are applied to a multiplexer circuit 6 to be multiplexed. A multiplexing method employed in this embodiment, similarly to that described in connection with FIGS. 2 and 3, is such that the digital audio signal 5-1 to 5-8, which has been sampled in the preceding one horizontal scanning period, is time-base shifted and inserted into the horizontal blanking period in every one-horizontal scanning period (1H) existing in the digital video signal 4-1 to 4-10.

The 10-bit digital multiplexed signal bits 7-1 to 7-10 multiplexed by the above method are applied to a parallel-to-serial convertor circuit (P/S circuit) 8 to be converted to a serial signal 9 having a clock frequency 10 times higher.

The digital audio signal bits 5-1 to 5-8 converted from the analog audio signal 2 by the A/D convertor 3-2 are also applied to a parallel-to-serial convertor circuit (P/S circuit) 41 to be converted to a serial signal 42.

In response to the changing over of the operation mode, either the serial signal 9 produced by the P/S circuit 8 in the multiplex transmission mode or the serial signal 42 produced by the P/S circuit 41 in the standby mode are applied to a selector circuit 10. The selector circuit 10, in response to a select signal from a selector control circuit 54, selects either the serial signal 9 or the serial signal 42, and outputs a selected signal as a serial signal 11. The serial signal 11 from the selector circuit 10 is transduced to an optical signal 13 by an electro-optical convertor (E/O) circuit 12, and sent to a receiver side through a transmission path.

On the receiver side, the optical signal 13 transmitted thereto through the transmission path is transduced to an electrical signal 15 by an opto-electrical transducer (O/E) circuit 14, and applied to a selector circuit 16.

The selector circuit 16, in response to a select signal 36 from a selector control circuit 56, selectively transfers the applied input signal to a serial-to-parallel convertor circuit (S/P circuit) 18 or to a serial-to-parallel convertor circuit (S/P circuit) 43.

The S/P circuit 18 converts the serial signal 17 outputted from the selector circuit 16 to parallel 10-bit digital signal bits 19-1 to 19-10 corresponding to the digital multiplexed signal bits 7-1 to 7-10 on the transmitter side. The 10-bit digital signal bits 19-1 to 19-10 produced by the S/P circuit 18 are applied to a demultiplexer circuit 20 which demultiplexes the applied digital signal bits into 10-bit digital video signal bits 21-1 to 21-10 and 8-bit digital audio signal bits 22-1 to 22-8 by an operation reverse to that of the multiplexer circuit 6 on the transmitter side.

The 10-bit digital video signal bits 22-1 to 22-10 are applied to a D/A convertor circuit 23-1 to reproduce an analog video signal 24 corresponding to the analog video signal 1 on the transmitter side.

A digital signal 30 applied to a S/P circuit 43 is converted to 8-bit digital audio signal bits 44-1 to 44-8, and then applied to a selector circuit 26 together with the digital audio signal bits 22-1 to 22-8 produced by the demultiplexer circuit 20. The selector circuit 26, in response to a select signal 38 from the selector control circuit 56, selects either the digital audio signal bits 22-1 to 22-8 produced by the demultiplexer circuit 20 or the digital audio signal bits 44-1 to 44-8 produced by the S/P circuit 43, and outputs selected digital audio signal bits as digital audio signal bits 45-1 to 45-8.

The digital audio signal bits 45-1 to 45-8 are further applied to a D/A convertor circuit 23-1 to reproduce an analog audio signal 27 corresponding to the analog audio signal 2 on the transmitter side.

In the configuration shown in FIG. 1, the transmitter side is provided with power supply circuits generating the output voltages, for example 300 volts d.c. for the multiplex transmission mode and 24 volts d.c. for the standby mode. In response to the changing over of the operation mode, the d.c. voltage corresponding to the operation mode is supplied to the receiver side through the power line 50. A power supply circuit 58-1 on the transmitter side is the power supply for the multiplex transmission mode, and controlled by a control signal 57-1 from a power supply selector circuit 53 to supply and stop electrical power to the A/D convertor circuits 3-1, 3-2, multiplexer circuit 6, and P/S circuit 8 (normally 5 volts) as explained later. A power supply circuit 58-2 is the power supply for the standby mode, and controlled by a control signal 57-2 from the power supply selector circuit 53 to supply and stop electrical power to the A/D convertor circuit 3-2 and P/S circuit 41 (normally 5 volts) as explained later.

Also, a power supply circuit 60-1 for the multiplex transmission mode on the receiver side is controlled by a control signal 59-1 from a power supply selector circuit 55 to supply and stop electrical power to the S/P circuit 18, demultiplexer circuit 20, and D/A convertor circuits 23-1, 23-2 as explained later. A power supply circuit 60-2 for the standby mode is controlled by a control signal 59-2 from the power supply selector circuit 55 to supply and stop electrical power to the S/P circuit 43 and D/A convertor circuit 23-2.

Alternatively, these power supply circuits 58-2, 58-2, 60-1, 60-2 may be organized such that separate power supply circuits are provided for respective groups for which the electrical power is controlled to be supplied and stopped.

In the configuration of the embodiment shown in FIG. 1, in a normal operation mode of multiplexed transmission in which the analog video signal 1 and the analog audio signal 2 are simultaneously transmitted, the 300-volt d.c. voltage is supplied from the 300-volt power supply circuit (not shown) to transmitter side and the receiver side via the power line 50. When the power supply detecting circuit 51 detects the supply of 300 volts d.c. for the multiplex transmission mode, the power supply detecting circuit 51 outputs signals 61-1 and 61-2 indicating the multiplex transmission mode to the power supply selector circuit 53 and the selector control circuit 54. The power supply selector circuit 53, in response to this signal 61-1, generates a control signal 57-1 for turning on the power supply circuit 58-1 for the multiplex transmission mode and a control signal 57-2 for turning off the power supply circuit 58-2 for the standby mode. The power supply circuit 58 supplies electrical power to the A/D convertor circuits 3-1, 3-2, multiplexer circuit 6, and P/S circuit 8, whereas the power supply circuit 58-2 in turn stops electrical power to the P/S circuit 41, whereby the respective circuits associated with the multiplex transmission are only set into an operative state on the transmitter side.

The selector control circuit 54, in response to the signal 61-2, outputs a select signal 35 to the selector circuit 10 for delivering the output signal 9 of the P/S circuit 8 to its output 11.

As a result, the analog video signal 1 and the analog audio signal 2, which have been converted to digital signals, multiplexed, and converted to a serial form, are selected for transmission to the receiver side.

In the multiplex transmission mode, on the receiver side, the power supply detecting circuit 52 receives the voltage in 300 volts supplied via the power line 50. When the power supply detecting circuit 52 detects the supply of 300 volts d.c. for the multiplex transmission mode, the power supply detecting circuit 52 outputs signals 62-1 and 62-2 indicating the multiplex transmission mode to the power supply selector circuit 55 and the selector control circuit 56 of the receiver side. The power supply selector circuit 55, in response to the signal 62-1 generates a control signal 59-1 for turning on the power supply circuit 60-1 for the multiplex transmission mode and a control signal 59-2 for turning off the power supply circuit 60-2 for the standby mode. The power supply circuit 60-1 supplies electrical power to the S/P circuit 18, demultiplexer circuit 20, and D/A convertor circuits 23-1, 23-2. The power supply circuit 60-2 stops power supply to the S/P circuit 43. In this way, the circuits associated with the multiplex transmission are set into an operative state on the receiver side.

Simultaneously, the selector control circuit 56, in response to the signal 62-2, generates a select signal 36 to the selector circuit 16 for outputting the electrical signal 15 converted from the corresponding optical signal by the O/E circuit 14 to the output 17 to the S/P circuit 18. Further, the selector control signal 56 generates a select signal 38 to the selector circuit 26 for delivering the digital audio signal bits 22-1 to 22-8 produced by the demultiplexer circuit 20 to the output of the selector circuit 26.

As a result, the D/A convertor 23-1 and the D/A convertor 23-2 simultaneously produce the analog video signal 24 and the analog audio signal 27 corresponding to the analog video signal 1 and the analog audio signal 2 sent from the transmitter side.

On the other hand, in an operation mode such as a standby mode in which the analog audio signal 2 only is transmitted without the analog video signal 1, the 24-volt d.c. voltage is supplied from the 24-volt power supply circuit (not shown) to the transmission side and the receiver side via the power line 50. When the power supply detecting circuit 51 detects the supply of 24 volts d.c. for the standby mode, the power supply detecting circuit 51 outputs signals 61-1 and 61-2 indicating the standby mode to the power supply selector circuit 53 and the selector control circuit 54. The power supply selector circuit 53, in response to the signal 61-1, generates a control signal 57-1 for turning off the power supply circuit 58-1 and a control signal 57-2 for turning on the power supply circuit 58-2. The power supply circuit 58-1 stops power supply to the A/D convertor circuit 3-1, multiplexer circuit 6, and P/S circuit 8, while the power supply circuit 58-2 supplies electrical power to the A/D convertor circuit 3-2 and P/S circuit 41, whereby the respective circuits other than the A/D convertor circuit 3-2 and the P/S circuit 41 are set into an inoperative state that is the standby mode.

Simultaneously, the selector control circuit 54, in response to the signal 61-2, generates a select signal 35 to the selector circuit 10 for delivering the output signal 42 of the P/S circuit 41 to the output of the selector circuit 10.

As a result, the analog audio signal 2 only is digitally converted and transmitted to the receiver side.

At this time, on the receiver side, the power supply detecting circuit 52 receives the 24-volt d.c. voltage via the power line 50. When the power supply detecting circuit 52 detects the supply of 24 volts d.c. for the standby mode, the power supply detecting circuit 52 outputs signals 62-1 and 62-2 indicating the standby mode to the power supply selector circuit 55 and the selector control circuit 56. The power supply selector circuit 55, in response to the signal 62-1 generates a control signal 59-1 for turning off the power supply circuit 60-1 and a control signal 59-2 for turning on the power supply circuit 60-2. The power supply circuit 60-1 stops power supply to the S/P circuit 18, demultiplexer circuit 20, and D/A convertor circuit 23-1, whereas the power supply circuit 60-2 supplies electrical power to the S/P circuit 43 and D/A convertor circuit 23-2, whereby the respective circuits other than the S/P circuit 43 and the D/A convertor circuit 23-2 are set into an inoperative state.

Simultaneously, the selector control circuit 56, in response to the signal 62-2, generates a select signal 36 to the selector circuit 16 for outputting the electrical signal 15 transduced by the O/E circuit 14 to the S/P circuit 43. Further, the selector control circuit 56 sends a select signal 38 to the selector circuit 26 for delivering the digital audio signal bits 44-1 to 44-8 produced by the S/P circuit 43 to the output of the selector circuit 26.

As a result, the analog audio signal 27 corresponding to the analog audio signal 2 sent from the transmitter side can be produced by the D/A convertor 23-2 while the multiplexer circuit 6, demultiplexer circuit 20, and A/C convertor circuit 3-1, D/A convertor circuit 23-1 and so on associated with the video signal are left in an inoperative state, thus reducing power consumption by a portion which would otherwise be consumed by the respective circuits now left in the inoperative state.

Next, a second embodiment of the present invention is shown in FIG. 4, and its operation will be described. Since the operation of the second embodiment in the normal operation mode, in which an analog video signal 1 and an analog audio signal 2 are simultaneously transmitted, is similar to the first embodiment shown in FIG. 1, explanation thereof will be omitted.

In the second embodiment, in an operation mode for a standby state in which an analog audio signal 2 only is transmitted, the analog audio signal 2 is applied to a voltage controlled oscillator circuit (hereinafter referred to as "VCO") 28 as a frequency adjusting voltage, and is frequency modulated about a reference frequency f0. The VCO 28, simultaneously with the frequency modulation, reshapes a frequency modulated signal to a square wave, whereby the analog audio signal 2 is converted to a binary-coded signal 29 represented only by digital "1" and "0" values and outputted to a selector circuit 10.

Here, a selector control circuit 54, in response to the signal 61-2, generates a select signal 35 to the selector circuit 10 for delivering the output signal 29 of the VCO 28 to the output 11 of the selector circuit 10. In the standby mode, the 24-volt d.c. voltage is supplied from the 24-volt power supply circuit (not shown) to the transmission side and the receiver side via the power line 50. When the power supply detecting circuit 51 detects the supply of 24 volts d.c. for the standby mode, the power supply detecting circuit 51 outputs signals 61-1 and 61-2 indicating the standby mode to the power supply selector circuit 53 and the selector control circuit 54. The power supply selector circuit 53, in response to this signal 61-1, generates a control signal 57-1 for turning off a power supply circuit 58-1 and a control signal 57-2 for turning on a power supply circuit 58-2. The power supply circuit 58-1 stops power supply to A/D convertor circuits 3-1, 3-2, multiplexer circuit 6, and P/S circuit 8, whereas the power supply circuit 58-2 is controlled to supply electrical power to the VCO 28, whereby the respective circuits associated with the multiplexed transmission are set into an inoperative state such as the standby mode.

As a result, the analog audio signal 2 only is frequency converted about a reference frequency $f_0$, converted to a binary coded signal, and transmitted to a receiver side.

At this time, on the receiver side, the power supply detecting circuit 52 receives the 24-volt d.c. voltage via the power line 50. When the power supply detecting circuit 52 detects the supply of 24 volts d.c. for the standby mode, the power supply detecting circuit 52 outputs signals 62-1 and 62-2 indicating the standby mode to the power supply selector circuit 55 and the selector control circuit 56. The power supply selector circuit 55, responsive to the signal 62-1 generates a control signal 59-1 for turning off a power supply circuit 60-1 and a control signal 59-2 for turning on a power supply circuit 60-2. The power supply circuit 60-1 stops power supply to a S/P circuit 18, demultiplexer circuit 20, and D/A convertor circuits 23-1, 23-2, while the power supply circuit 60-2 supplies electrical power to a demodulator circuit 31, whereby the respective circuits associated with the multiplexed transmission are set into an inoperative state.

Simultaneously, a selector control circuit 56, in response to the signal 62-2, applies a selector circuit 16 with a select signal 36 for delivering an electrical signal 15 converted by an O/E circuit 14 to the demodulator circuit 31.

In this way, the demodulator circuit 31 demodulates an inputted binary coded signal 30 (frequency modulated signal modulated about the reference frequency f0 by the VCO 28 on the transmitter side) to reproduce the original analog audio signal as an output 32 to a selector circuit 26.

The demodulator circuit 31 may be composed of a pulse density modulator circuit for generating pulses having a constant duration in synchronism with rising edges of a frequency modulated binary coded signal to convert the frequency modulated signal to a pulse density modulated signal, and a low pass filter for extracting low frequency components from the pulse density modulated signal to demodulate the pulse density modulated signal to an analog signal.

Then, the analog audio signal 32 demodulated by the demodulator circuit 31 is outputted to the selector circuit 26.

At this time, the selector control circuit 56 generates a select signal 38 to the selector circuit 26 for delivering the analog audio signal 32 demodulated by the demodulator circuit 31.

As result, the analog audio signal 27 corresponding to the analog audio signal 2 sent from the transmitter side can be delivered from the selector circuit 26.

In the second embodiment, since the A/D convertor circuits 3-1 and 3-2, multiplexer circuit 6, and P/S circuit 8 on the transmitter side as well as the S/P circuit 18, demultiplexer circuit 20, and D/A convertor circuits 23-1 and 23-2 on the receiver side can be set into an inoperative state, power consumption can be further reduced by a portion which would otherwise be consumed by the A/D convertor circuit 3-2 on the transmitter side and the D/A convertor circuit 23-2 on the receiver side.

While the second embodiment employs the frequency modulation as a means for modulating an analog audio signal to a binary coded signal, the present invention is not limited to this particular configuration, but any existing modulating means such as pulse modulation may be employed.

Also, the demodulator circuit 31 is not limited to the above-mentioned one, but any existing analog signal demodulator circuit may be employed.

Further, while the foregoing embodiments have been described in connection with an exemplary system which performs optical transmission employing an optical fiber cable as a transmission path, it goes without saying that the present invention may be applied to transmission employing a coaxial cable or the like or to wireless transmission.

In a case that the power supplying is made by placing the d. c. voltage upon the transmission signals in the coaxial cable without using the exclusive power line, the power supply detecting circuit 52 is placed before the selector circuit 16 of the receiver side (FIGS. 1 and 4) so as to detect the supplied voltage from the power supply circuit.

As described above, the present invention, when used in a digital transmission system for transmitting a plurality of signals, can set many digital processing circuits into an inoperative state when only a part of signals is transmitted.

Consequently, power consumption can be largely reduced by eliminating a portion of electrical power which has been consumed by the circuit components which can be made inoperative.

Actually, when an audio signal only was transmitted between a television camera and camera control circuits, the systems according to the embodiments shown in FIGS. 1 and 4 consumed electrical power approximately ⅟₁₀ the conventional system shown in FIG. 2.

It should be noted that the present invention is not limited to the specific embodiments described above, and that the appended claims encompass all improvements and modifications which fall within the scope of the present invention.

What is claimed is:

1. A digital signal transmission system wherein a plurality of original analog signals are converted to a plurality of digital signals, the plurality of digital signals are multiplexed and converted to a serial digital signal, and the serial digital signal is sent to a predetermined transmission path on a transmitter side, while the received serial digital signal is converted to multiplexed digital signals, and the plurality of multiplexed digital signals are demultiplexed and converted to the plurality of original analog signals on a receiver side, said digital signal transmission system comprising:

operation control means for placing a portion of said digital signal transmission system in an inoperative state during a mode for transmitting only a predetermined signal within said plurality of analog signals, said portion of said digital signal transmission system including at least means for performing digital conversion of said plurality of analog signals other than said predetermined signal, means for multiplexing the plurality of digital signals, and means for performing parallel-to-serial conversion on the transmitter side, and means for performing serial-to parallel conversion of the received serial digital signal, means for demultiplexing the multiplexed digital signals into a plurality of digital signals, and means for performing an analog conversion of the plurality of digital signals into the plurality of analog signals other than said predetermined signal on the receiver side;

means for converting said predetermined signal to a transmission signal at the transmitter side;

means for transmitting said transmission signal to said transmission path at the transmitter side; and means for converting the received transmission signal into the predetermined signal at the receiver side.

2. A digital signal transmission system according to claim 1, wherein the transmitter side includes, for separately converting only said predetermined signal to the transmission signal and sending the transmission signal onto said transmission path, means for converting a digitally converted version of said predetermined signal to a serial signal and means for selecting said serial signal and sending the same onto said transmission path, and the receiver side includes, for separately converting only said received transmission signal to the original predetermined signal, means for selecting and outputting said received serial signal, means for converting said selected serial signal to parallel digital signals, and means for selecting said parallel digital signals and sending the same to means for performing analog conversion to said predetermined signal.

3. A digital signal transmission system according to claim 1, wherein the transmitter side includes, for separately converting only said predetermined signal to the transmission signal and sending the transmission signal onto said transmission path, means for modulating said predetermined signal to a binary coded signal, and means for selecting said binary coded signal and sending the same onto said transmission path, and the receiver side includes, for separately converting only said received transmission signal to the original predetermined signal, means for selecting and outputting said modulated signal received on the receiver side, means for demodulating said selected modulated signal to the original predetermined signal, and means for selecting and outputting said demodulated predetermined signal.

4. A digital signal transmission system according to claim 3, wherein said digital signal transmission system further sets into an inoperative state, means for performing digital conversion of said predetermined signal on the transmission side, and means for performing analog conversion to said predetermined signal on the receiver side.

5. A digital signal transmission system according to claim 3, wherein said means for modulating said predetermined signal includes frequency modulating means for varying the frequency corresponding to a level of said predetermined signal.

6. A digital signal transmission system according to claim 3, wherein said means for demodulating to said predetermined signal includes means for pulse density modulating a signal which is frequency modulated by said modulating means, and analog converting means for converting said pulse density modulated signal to an analog signal having a level corresponding to the number of pulses.

7. A digital signal transmission system according to claim 1, further comprising transmitting means for transmitting signals between the transmitter side and the receiver side, said transmitting means including means for transducing an electrical signal to an optical signal, an optical transmission path including an optical fiber, and means for transducing an optical signal to an electrical signal.

8. A digital signal transmission system comprising:

a transmitter including:

a multiplexer circuit block for converting a plurality of analog signals to a plurality of digital signals, multiplexing the plurality of digital signals to a multiplexed signal, and sending said multiplexed signal onto a predetermined signal transmission path;

a particular signal processing circuit block for converting a particular signal within said plurality of analog signals to a transmission signal and sending the transmission signal to said transmission path; and a first control circuit for controlling said particular signal processing circuit block and said multiplexer circuit block so as to operate only said particular signal processing circuit block and to set said multiplexer circuit block into an inoperative state, and a receiver including:

a demultiplexer circuit block for demultiplexing said plurality of digital signals from said multiplexed signal received through said transmission path to restore said plurality of original analog signals;

a particular signal restoring circuit block for restoring the transmission signal converted from said particular signal received through said transmission path to the original particular signal; and a second control circuit for controlling said particular signal restoring circuit block and said demultiplexer circuit block so as to operate only said particular signal restoring circuit block and to set said demultiplexer circuit block into an inoperative state.

9. A digital signal transmission system according to claim 8, wherein:

said digital signal transmission system has a multiplexed transmission mode for operating both said multiplexer circuit block and said demultiplexer circuit block, and a particular signal transmission mode for only operating said particular signal processing circuit block and said particular signal restoring circuit block;

said first control circuit generates, in said particular signal transmission mode, a first control signal for stopping the operation of said multiplexer circuit block and operating said particular signal processing circuit block; and said second control circuit generates, in response to said first control signal, generates a second control signal for stopping the operation of said demultiplexer circuit block and only operating said particular signal restoring circuit block.

10. A digital signal transmission system according to claim 9, wherein:

said multiplexer circuit block in said transmitter includes:

A/D converting means for converting a plurality of analog signals to a plurality of digital signals;

a multiplexer circuit for multiplexing said plurality of digital signals; and parallel-to-serial converting means for converting a multiplexed signal to a serial data stream of digital signal, said transmitter further includes a first power supply circuit for supplying electrical power to said A/D converting means, said multiplexing means, and said parallel-to-serial converting means, and a second power supply circuit for supplying electrical power to said particular signal processing circuit block, said first control circuit, in response to said first control signal, stops supply of electrical power from said first power supply circuit and supplies electrical power from said second power supply circuit, said demultiplexer circuit block in said receiver includes:

serial-to-parallel converting means for converting said serial data stream of digital signal to a parallel digital signal;

a demultiplexer circuit for demultiplexing said plurality of digital signals from said parallel digital signal; and D/A converting means for restoring said plurality of original analog signals from the demultiplexed digital signals, said receiver further includes a third power supply circuit for supplying electrical power to said serial-to-parallel converting means, said demultiplexing means, said D/A converting means, and said particular signal restoring block, and a fourth power supply circuit for supplying electrical power to said particular signal restoring circuit block, and said second control circuit, in response to said second control signal, stops supply of electrical power from said third power supply circuit and supplies electrical power from said fourth power supply circuit.

11. A digital signal transmission system according to claim 10, wherein:

said particular signal processing circuit block in said transmitter includes an A/D convertor circuit for converting said particular analog signal to a parallel digital signal, and a parallel-to-serial convertor circuit for converting said particular parallel digital signal to a serial digital signal, and said particular signal restoring circuit block in said receiver includes a serial-to-parallel convertor circuit for converting said particular serial digital signal received through said transmission path to a particular parallel digital signal, and a D/A convertor circuit for converting said particular parallel digital signal to a particular analog signal.

12. A digital signal transmission system according to claim 10, wherein:

said particular signal processing circuit block in said transmitter includes binary coding means for frequency modulating said particular signal and converting said frequency converted signal to a binary signal having two values consisting of a high level and a low level, and said particular signal restoring circuit block in said receiver includes a demodulator circuit for demodulating said binary signal to the original particular signal.

13. A digital signal transmission system according to claim 12, wherein:

said demodulator circuit includes means for converting a frequency modulated signal to a pulse density modulated signal, and means for converting said pulse density modulated signal to an analog signal represented by a level in accordance with the number of pulses.

14. A digital signal transmission system according to claim 9, wherein:

said transmitter further includes a selector circuit for selecting either of an output of said multiplexer circuit block and an output of said particular signal processing circuit block, and said first control circuit generates a third control signal to said selector circuit for sending only said transmission signal of said particular signal processing circuit block to said transmission path in said particular signal transmission mode.

15. A digital signal transmission system according to claim 9, wherein:

said receiver further includes a selector circuit for selecting either of an output of said demultiplexer circuit block and an output of said particular signal restoring circuit block, and said second control circuit, in response to said first control signal, generates a fourth control signal to said selector circuit for selecting the output of said particular signal restoring circuit block in said particular signal transmission mode.

16. A digital signal transmission system according to claim 8, wherein:

said transmitter includes means for converting an output signal of said multiplexer circuit block and an output signal of said particular signal processing circuit block to respective optical signals;

said signal transmission path is an optical transmission path for transmitting said optical signals from said transmitter; and said receiver includes means for converting said optical signals from said optical transmission path to electrical signals.

17. A digital signal transmission system according to claim 8, wherein said particular signal processing circuit block includes means for converting the particular analog signal to the transmission signal having a signal form applicable to the signal transmission in said transmission path.

18. A digital signal transmission system according to claim 17, wherein said transmission signal is a digital signal.

19. A digital signal transmission system according to claim 17, wherein said transmission signal is a binary-level signal.

20. A multiplexed signal transmission system having:

a transmission unit including A/D converting means for converting a plurality of analog signals to digital signals, multiplexing means for multiplexing said plurality of digital signals to a parallel digital signal, and means for converting said multiplexed parallel digital signal to a serial digital signal and sending said serial digital signal onto a predetermined transmission path; and a reception unit including means for receiving said serial digital signal from said transmission path and converting said serial digital signal to said multiplexed parallel digital signal, demultiplexing means for demultiplexing a plurality of original digital signals from said parallel digital signal, and D/A converting means for converting said plurality of digital signals to a plurality of original analog signals, said system further comprising:

control means, operative in a mode for transmitting only a predetermined signal within said plurality of signals, for prohibiting at least one of an operation of said A/D converting means for converting an analog signal other than said predetermined signal to a digital signal, an operation of said multiplexing means, and an operation of said means for the conversion to said serial digital signal in said transmission unit, and an operation of said means for converting said serial digital signal to a parallel digital signal, an operation of said demultiplexing means, and an operation of said D/A converting means for converting a digital signal other than said predetermined signal to an analog signal, said transmission unit converting only said predetermined signal to a transmission signal, and said reception unit converting only said transmission signal from said transmission path to said original predetermined signal in said mode for transmitting only said predetermined signal.

21. A digital signal transmission system wherein a plurality of analog signals are converted to a plurality of digital signals, the plurality of digital signals are multiplexed and converted to a serial digital signal, and the serial digital signal is sent to a predetermined transmission path on a transmitter side, while the received serial digital signal is converted to multiplexed digital signals, and the plurality of multiplexed digital signals are demultiplexed and converted to the plurality of analog signals on a receiver side, said digital signal transmission system comprising:

an operation control circuit for placing a portion of said digital signal transmission system in an inoperative state during a mode for transmitting only a predetermined signal within said plurality of analog signals, said portion including at least a circuit for performing digital conversion of said plurality of analog signals other than said predetermined signal, a circuit for multiplexing the plurality of digital signals, and a circuit for performing parallel-to-serial conversion on the transmitter side, and a circuit for performing serial-to parallel conversion of the received serial digital signal, a circuit for demultiplexing the multiplexed digital signals into a plurality of digital signals, and a circuit for performing an analog conversion of the plurality of digital signals into the plurality of analog signals other than said predetermined signal on the receiver side;

a circuit for converting said predetermined signal to a transmission signal at the transmitter side;

a circuit for transmitting said transmission signal to said transmission path at the transmitter side; and a circuit for converting the received transmission signal into the predetermined signal at the receiver side.

22. A multiplexed signal transmission system having:

a transmission unit including an A/D converting circuit for converting a plurality of analog signals to digital signals, a multiplexing circuit for multiplexing said plurality of digital signals to a parallel digital signal, and a circuit for converting said multiplexed parallel digital signal to a serial digital signal and sending said serial digital signal onto a predetermined transmission path; and a reception unit including a circuit for receiving said serial digital signal from said transmission path and converting said serial digital signal to said multiplexed parallel digital signal, a demultiplexing circuit for demultiplexing a plurality of original digital signals from said parallel digital signal, and a D/A converting circuit for converting said plurality of digital signals from said parallel digital signal, and a D/A converting circuit for converting said plurality of digital signals to a plurality of original analog signals, said system further comprising:

a control circuit, operative in a mode for transmitting only a predetermined signal within said plurality of signals, for prohibiting at least one of an operation of said A/D converting circuit for converting an analog signal other than said predetermined signal to a digital signal, an operation of said multiplexing circuit, and an operation of said circuit for the conversion to said serial digital signal in said transmission unit, and an operation of said circuit for converting said serial digital signal to a parallel digital signal, an operation of said demultiplexing circuit, and an operation of said D/A converting circuit for converting a digital signal other than said predetermined signal to an analog signal, said transmission unit converting only said predetermined signal to a transmission signal, and said reception unit converting only said transmission signal from said transmission path to said original predetermined signal in said mode for transmitting only said predetermined signal.

* * * * *